(12) United States Patent
Nakazawa (10) Patent No.: US 11,979,530 B2
(45) Date of Patent: May 7, 2024

(54) CARRYING DEVICE

(71) Applicant: SEIKO EPSON CORPORATION, Tokyo (JP)

(72) Inventor: Kazuki Nakazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/337,464

(22) Filed: Jun. 20, 2023

(65) Prior Publication Data

US 2023/0421711 A1    Dec. 28, 2023

(30) Foreign Application Priority Data

Jun. 22, 2022  (JP) .................. 2022-100134

(51) Int. Cl.
*H04N 1/00* (2006.01)
*H04N 1/32* (2006.01)

(52) U.S. Cl.
CPC ..... *H04N 1/00559* (2013.01); *H04N 1/00082* (2013.01); *H04N 1/00557* (2013.01); *H04N 1/00689* (2013.01); *H04N 1/00891* (2013.01); *H04N 1/3263* (2013.01)

(58) Field of Classification Search
None
See application file for complete search history.

(56) References Cited

U.S. PATENT DOCUMENTS

| | | | | |
|---|---|---|---|---|
| 6,957,022 B2 * | 10/2005 | Hirai | ............ | G03G 15/70 399/21 |
| 2003/0156298 A1 * | 8/2003 | Matsuyama | .......... | G03G 15/70 358/1.1 |
| 2010/0086338 A1 * | 4/2010 | Hara | ................ | G03G 15/6561 399/406 |

FOREIGN PATENT DOCUMENTS

JP          2021-038090 A       3/2021

\* cited by examiner

*Primary Examiner* — Miya J Cato
(74) *Attorney, Agent, or Firm* — Global IP Counselors, LLP (57) ABSTRACT

There is configured a carrying device including a sensor for detecting presence of a medium, a carrying mechanism capable of making the transition between a carrying state capable of carrying the medium and a retreat state incapable of carrying the medium, and a processor, wherein when making the transition to a power-off state, the processor sets power off in the retreat state when the sensor detects the medium, and sets the power off in the carrying state when the sensor does not detect the medium.

6 Claims, 6 Drawing Sheets

MOVE UPWARD

MOVE DOWNWARD

CARRYING DEVICE

The present application is based on, and claims priority from JP Application Serial Number 2022-100134, filed Jun. 22, 2022, the disclosure of which is hereby incorporated by reference herein in its entirety.

BACKGROUND

1. Technical Field

The present disclosure relates to a carrying device.

2. Related Art

In the past, there has been known an image scanning device equipped with an ADF (Automatic Document Feeder) (e.g, JP-A-2021-38090). In the ADF, an original document mounted on a document tray is fed by a pickup roller.

In power-off processing of the carrying device equipped with the pickup roller for picking up a medium, there is a problem that the medium is slightly drawn into a carrying path without intention when the pickup roller is located at a position where the pickup roller has contact with the medium on the document tray.

SUMMARY

In view of the problems described above, a carrying device according to the present disclosure includes a stage configured to mount a medium, a sensor configured to detect whether the medium is mounted on the stage, a carrying mechanism which is configured to be displaced between a carrying position where the carrying mechanism carries the medium mounted on the stage, and a retreat position where the carrying mechanism does not carry the medium, and a processor, wherein when making a transition to a power-off state, the processor sets power off in a state in which the carrying mechanism is located at the retreat position when the sensor detects the medium, and sets the power off in a state in which the carrying mechanism is located at the carrying position when the sensor does not detect the medium.

DESCRIPTION OF EXEMPLARY EMBODIMENTS

Here, some embodiments of the present disclosure will be described in the following order.

(1) Configuration of Image Scanning Device:
(2) Power-Off Processing:
(3) Other Embodiments:

(1) Configuration of Image Scanning Device

Figure 1:
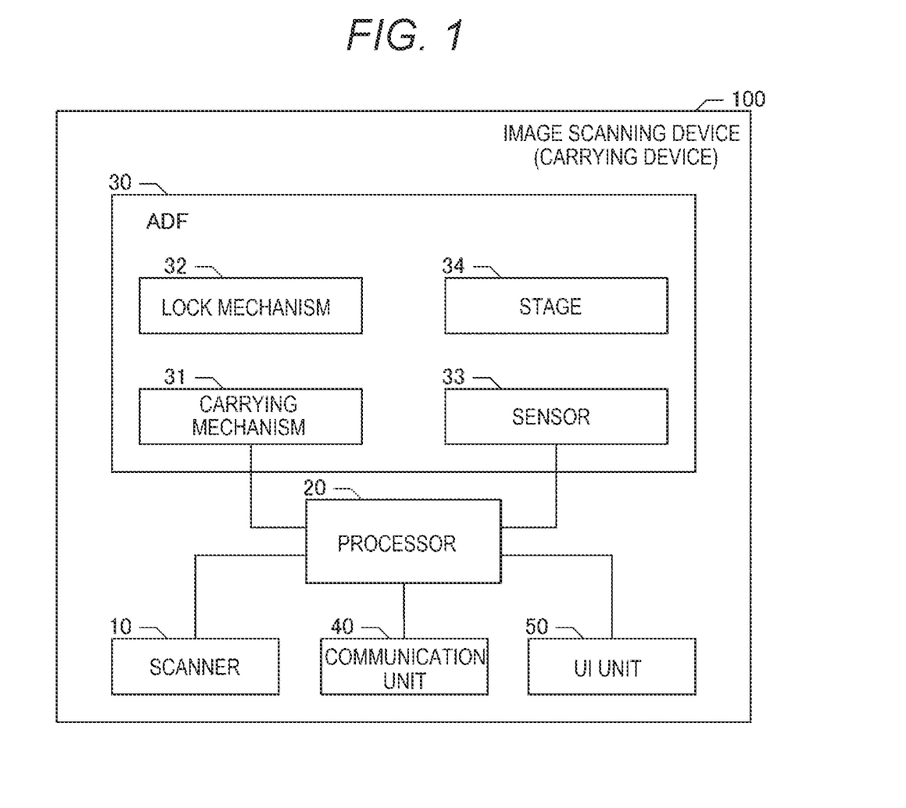
FIG. 1 is a block diagram of an image scanning device.

FIG. 1 is a block diagram showing a configuration of an image scanning device 100 as the carrying device according to an embodiment of the present disclosure. The image scanning device 100 is provided with a scanner 10, a processor 20, an ADF (Automatic Document Feeder) 30, a communication unit 40, and a UI unit 50. The scanner 10 is provided with an image sensor, a light source, and an optical system. The light source irradiates a medium carried by the ADF 30 with light. The optical system includes at least one lens, and the image sensor includes a photoelectric conversion element. The photoelectric conversion element receives reflected light from the medium via the optical system, and then converts the reflected light into an electric signal. The image sensor is provided with an analog front-end. The analog front-end includes a circuit which applies gain to a signal output by the photoelectric conversion element in accordance with an amount of light received, and then outputs the result, and a circuit for performing an A/D conversion. The scanner generates image data representing a scanning result of the medium from the signal output from the image sensor, and then outputs the image data via the communication unit 40.

The communication unit 40 includes a variety of types of removable memory attached to the image scanning device 100, and a communication interface circuit for performing communication with other devices connected to the image scanning device 100 with wire or wirelessly in compliance with a variety of communication protocols. The UI unit 50 includes an input section such as a power button, or scanning start button, and an output section such as LEDs representing a status of the image scanning device 100. When the power button or the scanning start button is held down, the UI unit 50 outputs a signal representing the button thus held down to the processor 20. Further, when the image scanning device 100 is in a power-on state, the processor 20 put the LED on in an aspect of representing that the image scanning device 100 is in the power-on state.

The processor 20 executes a variety of programs stored in a ROM, a storage medium, and so on to thereby control the image scanning device 100. The processor 20 can be formed of a single chip, or can also be formed of a plurality of chips. The processor 20 can be formed of a CPU, or can be formed of an ASIC or the like, or can also be constituted by the CPU and the ASIC.

The ADF 30 is provided with a stage 34 for mounting the medium as a document to be scanned, a sensor 33 for detecting whether the medium is mounted on the stage 34, a carrying mechanism 31 for carrying the medium, and a lock mechanism 32 for the carrying mechanism 31.

Figure 2:
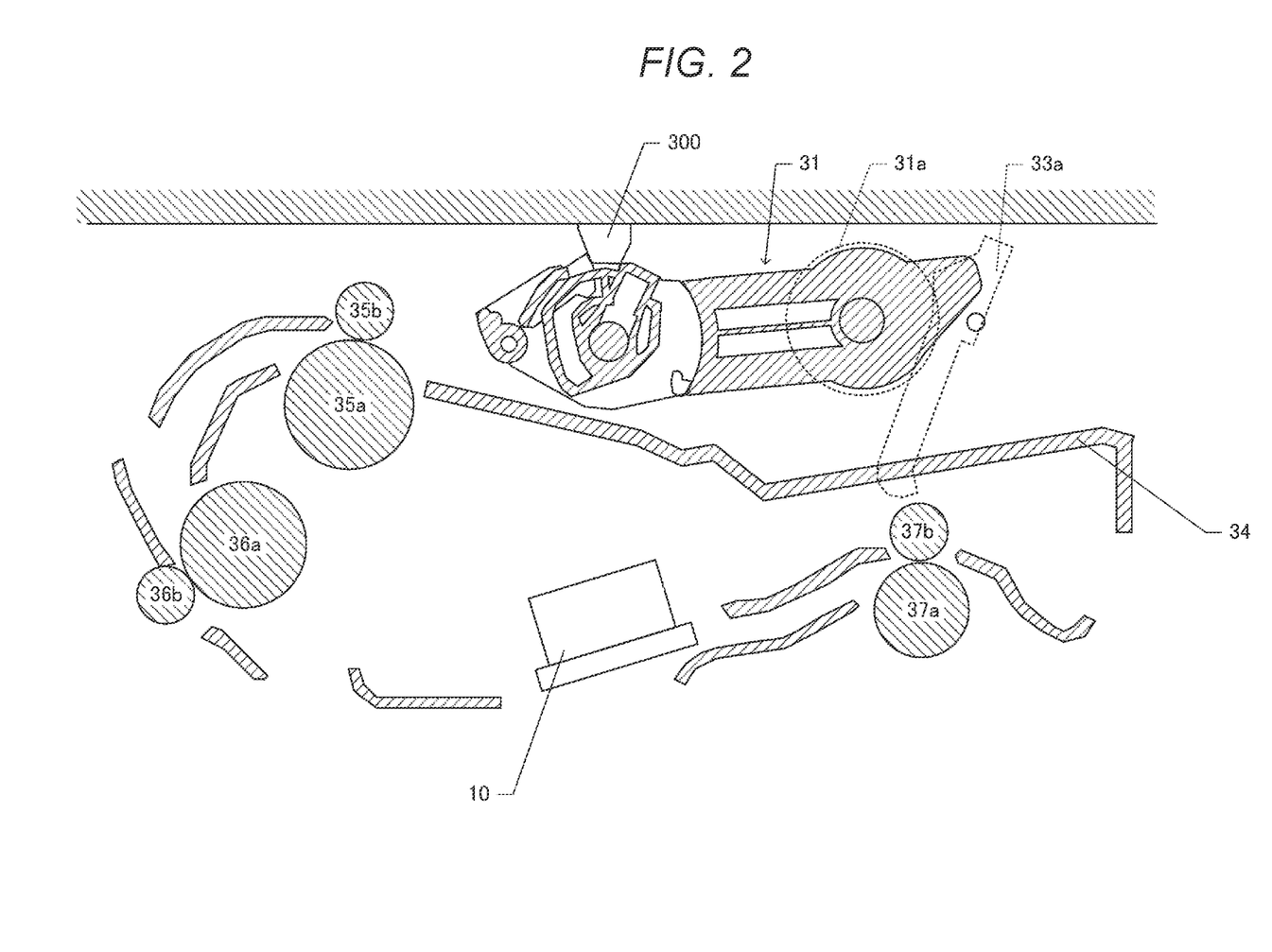
FIG. 2 is a diagram showing a carrying mechanism located at a retreat position.
Figure 3:
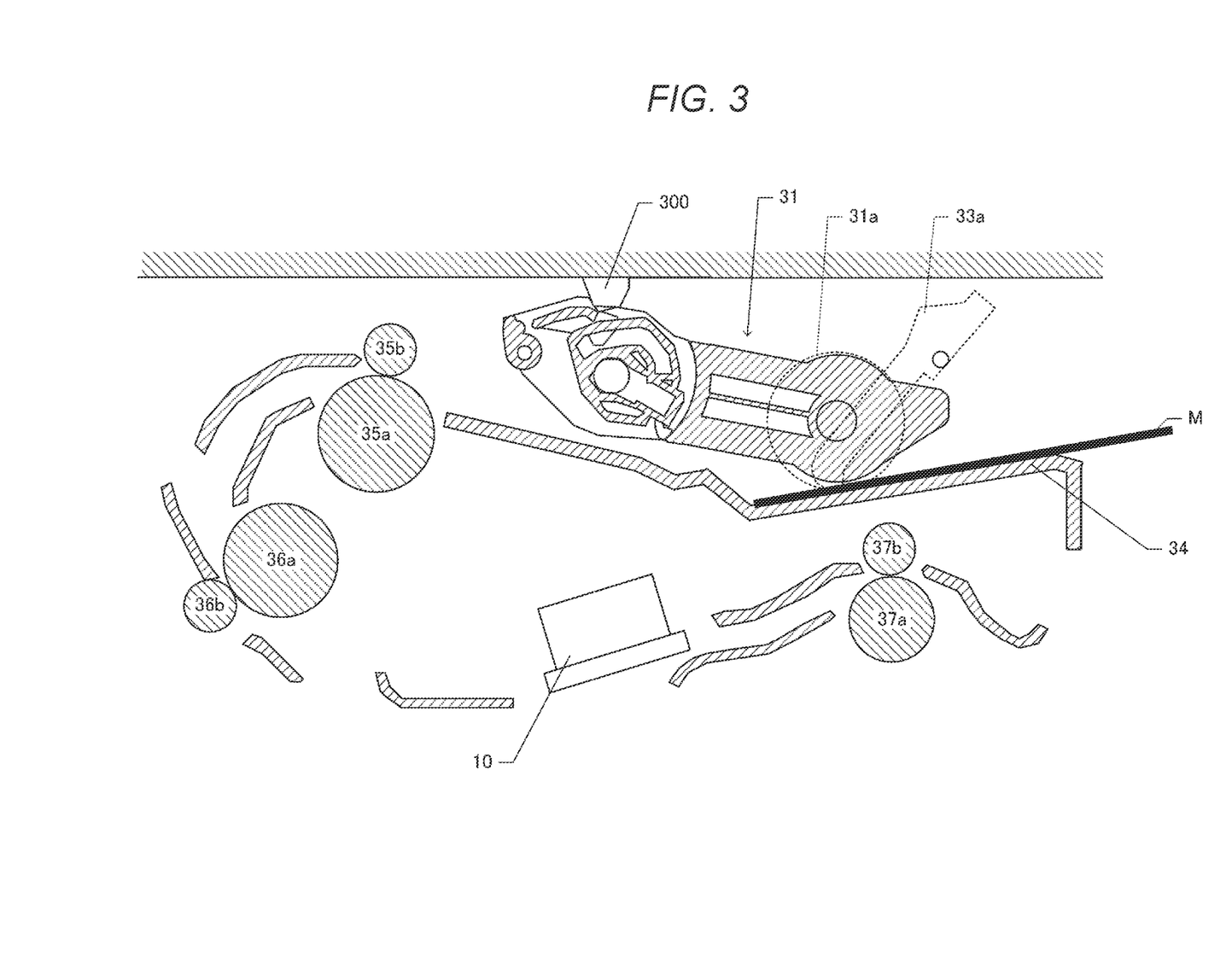
FIG. 3 is a diagram showing a carrying mechanism located at a carrying position.

FIG. 2 and FIG. 3 are diagrams showing a configuration of the ADF 30. The carrying mechanism 31 is a mechanism for carrying the medium M. In the present embodiment, the sensor 33 is a contact sensor having a lever 33a, and is configured so as to detect that the medium M is present on the stage 34 by the medium M mounted on the stage 34 pushing up the lever 33a when the medium M is mounted on the stage 34. The carrying mechanism 31 includes a pickup roller 31a. The carrying mechanism 31 can be displaced between a carrying position (FIG. 3) where the carrying mechanism 31 can carry the medium M on the stage 34, and a retreat position (FIG. 2) where the carrying mechanism 31 cannot carry the medium M. When the carrying mechanism 31 is located at the carrying position, the pickup roller 31a makes contact with the medium M mounted on the stage 34. The retreat position is located above the carrying path of the medium M on the stage 34, and when the carrying mechanism 31 is located at the retreat position, the pickup roller 31a does not make contact with the medium M mounted on the stage 34.

The processor 20 keeps the carrying mechanism 31 at the retreat position as shown in FIG. 2 in a non-carrying state when powered on, and displaces the carrying mechanism 31 to the carrying position as shown in FIG. 3 in accordance with a start of scanning (a start of carrying). The start of scanning is instructed by holding down a scanning start button of the UI unit 50. It should be noted that it is possible for the start of scanning to be instructed by an external device via the communication unit 40.

As shown in FIG. 2, when the carrying mechanism 31 is located at the retreat position, it is possible for the user to put the medium on the stage 34. In accordance with the scanning start instruction, the processor 20 move the carrying mechanism 31 downward to be displaced to the carrying position as shown in FIG. 3, and then drives the pickup roller 31a with the drive of a motor not shown to feed the medium M. Further, the processor 20 drives the motor not shown to rotate carrying rollers 35a, 36a and so on arranged on the carrying path. When the medium M passes by the scanner 10, the medium is scanned by the image sensor, and thus, the image data is generated. The medium having passed by the scanner 10 is discharged from the carrying path by carrying rollers 37a, 37b. When the medium M remains on the stage 34, the processing described above on and after paper feed by the pickup roller 31a is repeated. When the scanning of all of the media M on the stage 34 is completed, the processor 20 displaces the carrying mechanism 31 to the retreat position and then keeps the carrying mechanism 31 there.

When the user holds down the power button when the image scanning device 100 is in the power-on state, the processor 20 performs power-off processing described later to make the transition to a power-off state. When making the transition to the power-off state, in order to prevent the transition to the power-off state with the medium remaining in the carrying path, the processor 20 makes the image scanning device 100 perform a discharge operation for discharging the medium M in the middle of the carriage when making the transition to the power-off state. Here, the medium M in the middle of the carriage means a medium having already been picked up by the pickup roller 31a. The middle of the carriage means a state in which the carriage progresses further than in the state in which the medium can be returned to the stage 34 by a reverse rotation of the pickup roller 31a. The discharge is performed on the medium in such a state by rotating the carrying rollers 35a, 36a, and 37a. It should be noted that the scanning is not performed on this occasion. Then, after making the image scanning device 100 perform the discharge operation, the processor 20 arranges the carrying mechanism 31 at a position corresponding to the detection result of the sensor 33.

When the carrying mechanism 31 is supposedly located at the carrying position, and at the same time, the medium M is present on the stage 34, the image scanning device 100 is powered off in the state in which the medium M is slightly drawn into the carrying path by the pickup roller 31a. When the user attempts to pull out the medium M in this case, there is a possibility that the medium M is broken. Further, also when the user repeats power-on and power-off after the image scanning device 100 is powered off in the state in which the medium M is slightly drawn into the carrying path, there is a possibility that the medium M is broken. Therefore, when the processor 20 makes the transition to the power-off state, when the sensor 33 has detected the medium M, the processor 20 raises the carrying mechanism 31, and then performs the power-off in the state in which the carrying mechanism 31 is located at the retreat position. In this way, it is possible to prevent that the medium M on the stage 34 is slightly carried without intention and then the transition to the power-off state is made when the medium M is present on the stage 34.

Figure 4:
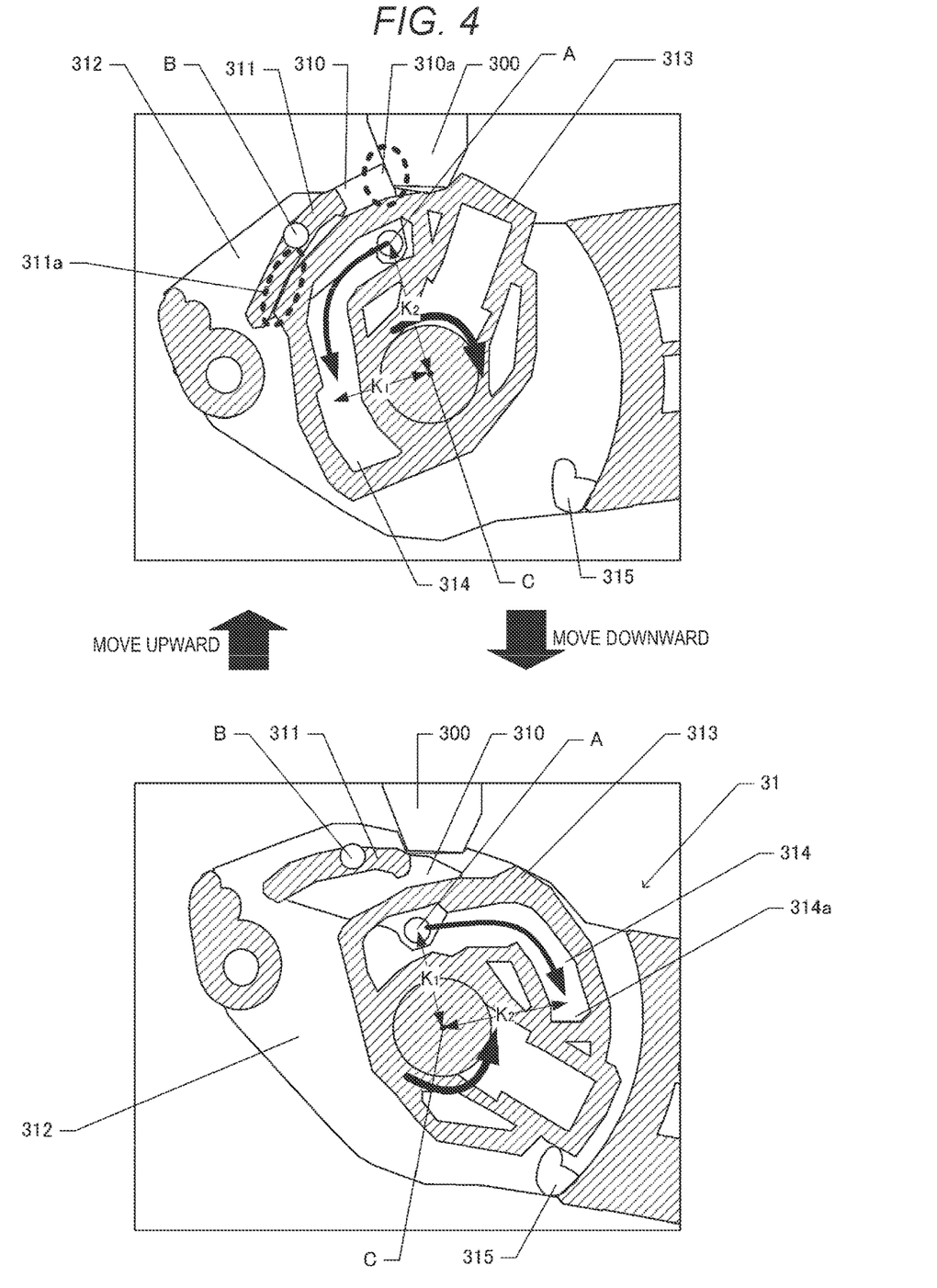
FIG. 4 is a diagram showing a motion between the retreat position and the carrying position.

In the present embodiment, the lock mechanism 32 (FIG. 1) is a mechanism of locking the carrying mechanism 31 at the retreat position. FIG. 4 is an explanatory diagram for explaining an action when the carrying mechanism 31 is displaced between the retreat position and the carrying position. When raising the carrying mechanism 31 from the carrying position to the retreat position, namely when displacing the carrying mechanism 31 from the state shown in a lower drawing in FIG. 4 to the state shown in an upper drawing, a component 313 rotates counterclockwise centering on an axis C by a drive force of a motor not shown. A component 311 is a component which is fixed to a component 310 to be integral with the component 310, and the component 310 and the component 311 are rotatably attached to a component 312 with a shaft B. The component 310 is hanged in a hollow 314 of the component 313 with a shaft A. When the component 313 rotates counterclockwise, the shaft A reaches an end portion 314a of the hollow 314 along an inner wall of the component 313 forming the hollow 314. A distance $K_2$ between the shaft A and the axis C when the shaft A has reached the end portion 314a is longer than a distance $K_1$ between the shaft A and the axis C when the carrying mechanism 31 is located at the carrying position. Therefore, the component 310 and the component 311 rotate counterclockwise centering on the shaft B. Further, a whole of the carrying mechanism 31 including the component 312 rotates counterclockwise in the process in which the shaft A reaches the end portion 314a, and thus, the carrying mechanism 31 is located at the retreat position (the upper drawing in FIG. 4).

Inside a chassis of the image scanning device 100, there is formed a protruding part 300. When the carrying mechanism 31 is located at the retreat position, a corner portion 310a of the component 310 makes contact with the protruding part 300. Although a force of rotating the carrying mechanism 31 clockwise acts on the carrying mechanism 31 when the carrying mechanism 31 is located at the retreat position due to the own weight of the carrying mechanism 31, the protruding part 300 inhibits the component 310 and the component 311 from rotating clockwise centering on the shaft B, and an end portion 311a of the component 311 inhibits the component 313 from rotating clockwise. Due to such a lock mechanism 32 (the components 310, 311, 313, and the protruding part 300), it is possible for the carrying mechanism 31 to keep at the retreat position.

It should be noted that when releasing the lock, namely when displacing the carrying mechanism 31 from the retreat position to the carrying position (from the upper drawing to the lower drawing in FIG. 4), the component 313 is rotated clockwise centering on the axis C with a drive force by the motor not shown. As a result, since the shaft A is separated from the end portion 314a of the hollow 314, and the distance between the shaft A and the axis C becomes shorter than $K_2$, and thus, the shaft A comes closer to the axis C, the corner portion 310a is released from the protruding part 300. Therefore, the lock is released, and the component 313 rotates clockwise until the component 313 reaches the component 315. In the process in which the component 313 reaches the component 315, the whole of the carrying mechanism 31 rotates clockwise centering on the axis C as much as a predetermined amount, and thus, the carrying mechanism 31 is displaced to the carrying position.

Incidentally, the image scanning device 100 is transported in some cases when changing an installation position of the image scanning device 100 and so on. Further, the image scanning device 100 can be dropped when being transported. When a drop impact is applied to the image scanning device 100 when the carrying mechanism 31 is located at the retreat position, namely when the carrying mechanism 31 is in the lock state as shown in the upper drawing in FIG. 4, a force of rotating the whole of the carrying mechanism 31 clockwise centering on the axis C acts thereon. However, since the corner portion 310a of the component 310 is inhibited by the protruding part 300 from rotating, the weight is instantaneously applied to the shaft B. There is a possibility that the shaft B is broken as a result.

Therefore, when the sensor 33 does not detect the medium M, the processor 20 powers off the image scanning device 100 in the state in which the carrying mechanism 31 is located at the carrying position. Therefore, according to the present embodiment, by locating the carrying mechanism 31 at the carrying position when the medium M does not remain on the stage 34, it is possible to reduce the possibility that the shaft B is broken by the drop impact. Further, since the medium M does not remain on the stage 34, it is possible to avoid drawing of the medium M. Further, it is also possible to avoid that the medium M becomes in a jammed state when repeating the power-off/on operations, and thus the medium M is broken.

It should be noted that medium detection sensors are provided at a plurality of places in the carrying path in the ADF 30 besides the sensor 33 for detecting the medium on the stage 34. The processor 20 determines whether there occurs the state (jam error) in which the medium jams in the carrying path based on a rotational amount of the carrying rollers for the medium and outputs of the respective medium sensors. When making the transition to the power-off state, the processor 20 does not displace the carrying mechanism 31 when the jam error occurs, or displaces the carrying mechanism 31 as described above in accordance with the detection result of the sensor 33 when the jam error does not occur. Due to the configuration of preventing the carrying mechanism 31 from being displaced when the jam error occurs, it is possible to reduce the possibility that the medium M is broken.

(2) Power-Off Processing

Figure 5:
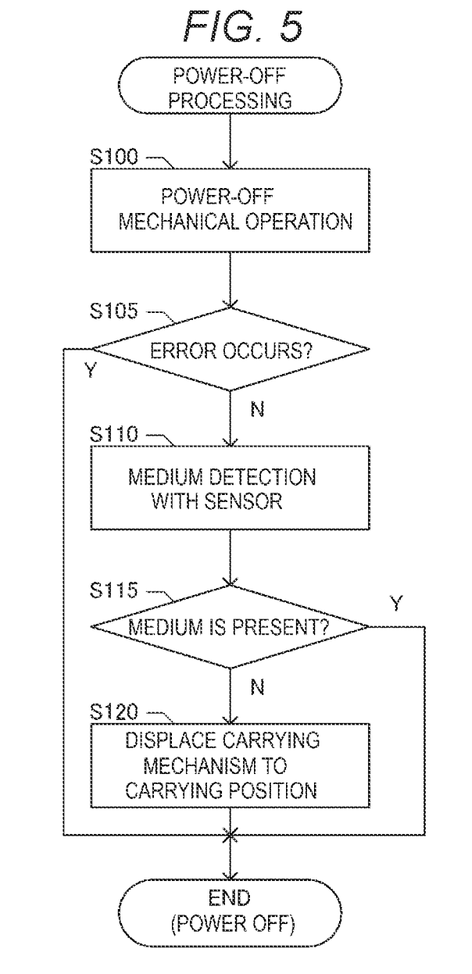
FIG. 5 is a flowchart of power-off processing.
Figure 6:
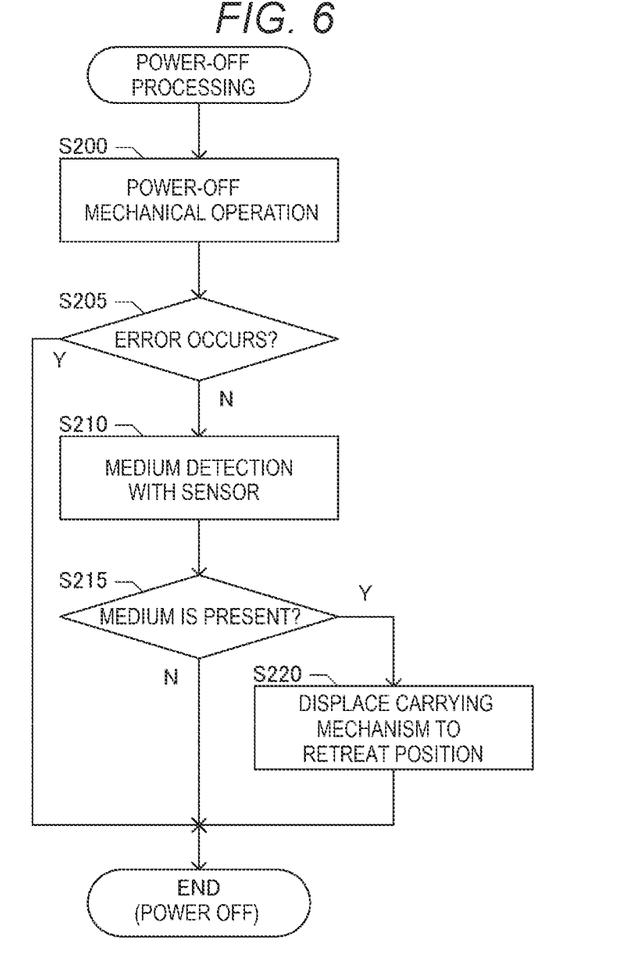
FIG. 6 is a flowchart of power-off processing.

FIG. 5 and FIG. 6 are each a flowchart showing the power-off processing. The power-off processing is processing which is started when the power button is held down when the image scanning device 100 is in the power-on state. The power-off processing is different between FIG. 5 and FIG. 6 in the final position of the carrying mechanism 31, namely whether the final position of the carrying mechanism 31 is the retreat position or the carrying position, in a power-off mechanical operation (steps S100, S200) performed in accordance with a power-off instruction. Which one is selected is different by a model. FIG. 5 shows the power-off processing to be executed in a model in which the final position of the carrying mechanism 31 is the retreat position in the power-off mechanical operation, and FIG. 6 shows the power-off processing to be executed in a model in which the final position is the carrying position.

First, the power-off processing in the model in which the final position of the carrying mechanism 31 in the power-off mechanical operation is the retreat position will be described with reference to FIG. 5. When the power-off processing is started, the processor 20 makes the image scanning device 100 perform (step S100) the power-off mechanical operation. Specifically, the processor 20 rotates the carrying rollers (except the pickup roller 31a) of the ADF 30 to discharge the medium remaining in the carrying path. On this occasion, the carrying mechanism 31 is displaced between the retreat position and the carrying position, and is finally located at the retreat position when the processing in the step S100 ends.

Subsequently, the processor 20 determines (step S105) whether or not the error occurs. Specifically, the processor 20 determines whether or not the jam error occurs based on the outputs of the medium detection sensors. When it is not determined in the step S105 that the error occurs, the processor 20 performs (step S110) the medium detection by the sensor 33 to determine (step S115) whether or not the medium is present. In other words, whether or not the medium is present on the stage 34 is determined based on the output of the sensor 33.

When it is not determined in the step S115 that the medium is present, namely the medium is not present on the stage 34, the processor 20 makes the image scanning device 100 displace (step S120) the carrying mechanism 31 to the carrying position. As a result, it is possible to reduce the possibility that the components of the lock mechanism 32 are broken when the image scanning device 100 drops. Further, since the medium M is not present on the stage 34, there is no chance for the medium M to be drawn into the carrying path. When it is determined in the step S115 that the medium is present, the processor 20 keeps the carrying mechanism 31 at the retreat position without displacing the carrying mechanism 31. As a result, it is possible to prevent the medium M on the stage 34 from being slightly drawn into the carrying path.

When it is determined in the step S105 that the error occurs, the processor 20 ends the power-off processing while keeping the carrying mechanism at the retreat position without displacing the carrying mechanism. Therefore, it is possible to reduce the possibility that the medium jamming in the carrying path is broken.

Then, the power-off processing in the model in which the final position of the carrying mechanism 31 in the power-off mechanical operation is the carrying position will be described with reference to FIG. 6. When the power-off processing is started, the processor 20 makes the image scanning device 100 perform (step S200) the power-off mechanical operation. Specifically, the processor 20 rotates the carrying rollers of the ADF 30 to discharge the medium M remaining in the carrying path. On this occasion, the carrying mechanism 31 is displaced between the retreat position and the carrying position, and is finally located at the carrying position when the processing in the step S200 ends.

The processing in the subsequent steps S205, S210, and S215 is substantially the same as that in the steps S105, S110, and S115 shown in FIG. 5. When it is determined in the step S215 that the medium is present, the processor 20 displaces (step S220) the carrying mechanism 31 to the retreat position. As a result, it is possible to prevent the medium M on the stage 34 from being slightly drawn into the carrying path. When it is not determined in the step S215 that the medium is present, namely the medium M is not present on the stage 34, the processor 20 ends the power-off processing while keeping the carrying mechanism 31 at the carrying position without displacing the carrying mechanism 31. As a result, it is possible to reduce the possibility that the components of the lock mechanism 32 are broken when the image scanning device 100 drops. Further, since the medium M is not present on the stage 34, there is no chance for the medium M to be drawn into the carrying path.

When it is determined in the step S205 that the error occurs, the processor 20 ends the power-off processing while keeping the carrying mechanism at the carrying position without displacing the carrying mechanism. As a result, it is possible to reduce the possibility that the medium jamming in the carrying path is broken.

(3) Other Embodiments

The embodiment described above is an example for implementing the present disclosure, and a variety of embodiments can be adopted besides the above. For example, it is sufficient for the carrying device to be a device capable of carrying the medium, the ADF of the image scanning device is not a limitation, and it is possible to apply the present disclosure to a variety of devices having a carrying mechanism for carrying the medium such as a printing device or a laminating machine.

Further, there is described the example in which the retreat position of the carrying mechanism is located above the carrying path of the medium in the embodiment described above, but it is possible to adopt a configuration in which the retreat position of the carrying mechanism is located at other positions than the position above the carrying path.

The sensor for detecting whether the medium is present on the stage can be what is configured to mechanically detect the presence or absence of the medium, or can be what is configured to optically detect the presence or absence of the medium.

Further, the present disclosure can also be applied as a program to be executed by a computer and a method. Further, the system, the program, and the method described above can be realized by a single device in some cases, or can also be realized by using components provided to a plurality of devices in some cases, and therefore, include a variety of aspects. Further, a modification such as a configuration of partially using software and partially using hardware can arbitrarily be adopted. Further, the present disclosure is also realized as a computer-readable recording medium storing the program for controlling a system. Obviously, the recording medium for storing the program can be a magnetic recording medium or a semiconductor memory, and completely the same also applies to any recording media to be developed in the future.

What is claimed is:

1. A carrying device comprising:
   a stage configured to mount a medium;
   a sensor configured to detect whether the medium is mounted on the stage;
   a carrying mechanism which is configured to be displaced between a carrying position where the carrying mechanism carries the medium mounted on the stage, and a retreat position where the carrying mechanism does not carry the medium; and
   a processor, wherein
   when making a transition to a power-off state, the processor sets power off in a state in which the carrying mechanism is located at the retreat position when the sensor detects the medium, and sets the power off in a state in which the carrying mechanism is located at the carrying position when the sensor does not detect the medium.

2. The carrying device according to claim 1, further comprising:
   a lock mechanism configured to lock the carrying mechanism when powered off at the retreat position.

3. The carrying device according to claim 1, wherein
   when making the transition to the power-off state, the processor arranges the carrying mechanism at a position corresponding to a detection result of the sensor after making the carrying device perform discharge of the medium in a middle of carriage.

4. The carrying device according to claim 1, wherein
   in a non-carrying state when powered on, the processor keeps the carrying mechanism at the retreat position, and displaces the carrying mechanism to the carrying position in accordance with a start of carriage.

5. The carrying device according to claim 1, wherein
   the carrying mechanism includes a pickup roller, and
   the retreat position is a position where the pickup roller stays above a carrying path of the medium.

6. The carrying device according to claim 1, wherein
   when making the transition to the power-off state, the processor does not displace the carrying mechanism when a jam error occurs, and displaces the carrying mechanism in accordance with a detection result of the sensor when the jam error does not occur.

* * * * *